| United States Patent [19] | [11] | 4,451,329 |
|---|---|---|
| Batchelor et al. | [45] | May 29, 1984 |

[54] METHODS AND COMPOSITIONS FOR PRODUCING DECORATIVE FROSTING EFFECTS ON GLASS

[75] Inventors: Gary R. Batchelor, Millville; Carmen A. Russo, Sr., Mays Landing; Martin Bradley, Vineland, all of N.J.

[73] Assignee: Wheaton Industries, Millville, N.J.

[21] Appl. No.: 524,875

[22] Filed: Aug. 22, 1983

[51] Int. Cl.$^3$ .................. B44C 1/22; C03C 15/00; C03C 25/06
[52] U.S. Cl. .................. 156/660; 156/659.1; 156/663; 156/904; 430/313; 430/317; 430/321; 430/270
[58] Field of Search .................. 65/31; 430/270, 281, 430/284, 285, 268, 287, 313, 317, 321; 156/659.1, 660, 663, 904; 51/310, 312; 427/43.1, 54.1

[56] References Cited

U.S. PATENT DOCUMENTS

| 4,208,211 | 6/1980 | Bowden et al. | 430/321 X |
|---|---|---|---|
| 4,253,910 | 3/1981 | Mason et al. | 156/663 X |
| 4,323,423 | 4/1982 | Schtunk | 156/645 |

*Primary Examiner*—William A. Powell
*Attorney, Agent, or Firm*—Ratner & Prestia

[57] ABSTRACT

This invention pertains to a method and a composition for selectively etching an image on a glass surface to produce decorative frosting effects. More particularly, the method pertains to: depositing on the surface the negative of the image to be etched, a pattern of a crosslinkable resin capable, upon crosslinking, of resisting a subsequently applied etchant and also capable, upon crosslinking, of being removed from said surface by stripping with hot water or steam treatment; crosslinking said resin; applying an etchant to said surface; and removing said crosslinked resin. More particularly, the composition pertains to the combination of an acrylate oligomer, an acrylate monomer capable of crosslinking with said acrylate oligomer, and a crosslinking agent.

21 Claims, No Drawings

METHODS AND COMPOSITIONS FOR PRODUCING DECORATIVE FROSTING EFFECTS ON GLASS

BACKGROUND OF THE INVENTION

This invention pertains to a method of selectively etching an image on a glass surface for producing decorative effects.

Frosting of glass surfaces has been commonly used in the glass industry for many years to produce a matt, opaque surface in order to enhance the aesthetic qualities of glass objects. A commonly used method to obtain this frosted appearance is acid dipping. This consists of immersion of the glass object in a bath of hydrofluoric acid, various fluoride salts, or various organic materials which modify the texture of the frosted surface. More recently, "particulate blasting", i.e. impelling hard particles against the surface of the glass object has been used to produce a similar frosted appearance. Sand or grit are typical of the hard particles which may be used. Thus, particulate blasting may comprise either sandblasting or grit blasting.

There has been a demand within the glass industry to produce objects having selectively frosted and unfrosted areas on the same article. Examples are glass containers which are entirely frosted except areas of lettering or designs which remain unfrosted and clear. The unfrosted areas of the glass contrast sharply with the frosted surface, thus producing a desired aesthetic effect.

Several techniques have been employed in the past to produce such decorative effects. One such technique involves the use of screenable, organic-based acid resists for acid frosting. This screening is commonly termed "silk screening" but nylon, polyester, and stainless steel are currently used as the screen materials.

This method employs a mixture of petroleum products which is heated to a liquid state and applied by screening to form a decorative pattern on the glass surface. Upon contacting the glass, the material partially solidifies, maintaining the decorative pattern until complete drying is obtained over a period of time. Following complete drying of the organic-based decoration, the glass article is immersed in an acid bath. Hydrofluoric acid, various fluoride salts and various organic materials which modify the texture of the surface may be used in this acid dipping technique.

All surfaces of the glass article not covered with acid resist will receive the desired frosted appearance. Following immersion in the acid bath, the glass article is rinsed with water to remove excess acid solution. After rinsing, the desired frosted areas and the organic mask material remain. The organic mask must then be removed in order to exhibit the unfrosted glass decoration. Thus, two separate operations are required after the acid bath: the rinsing of the excess acid and the removal of the mask.

The organic mask is removed by one of the following techniques. In the first technique the glass surface is soaked in a hot solvent to soften the mask material. The surface is then washed with detergent to remove mask material and solvent. This is followed with a water rinse to remove the residual detergent. The second technique commonly used involves heating the decorated glass article to a temperature for a period of time which will pyrolyze or burn off the organic mask material. Some carbon deposits may remain, requiring subsequent water washing. Both of these techniques involve several steps and an undesirable amount of time.

This method of producing acid frosting using screenable, organic-based acid resist has several disadvantages including the fact that it is limited to screen application of the decoration and the fact that the reclaiming of improperly decorated articles is very difficult and time consuming. Furthermore, precise temperature control must be maintained during the decorating procedure since it requires heated screens. After the glass surface has been frosted, there is a drying period necessary prior to the performance of the next operation. Finally, the removal of the mask material following frosting is both time consuming and expensive, involving either the use of a solvent and detergent along with several rinses or the use of high temperature along with a second rinse.

Another technique commonly used to achieve selective etching of glass surfaces is sand or grit blasting through pattern-defining stencil. The stencil is commonly formed of a resilient material such as rubber or plasticized vinyl. Areas of the glass article which are to remain unfrosted are covered with the stencil, and areas to be frosted remain uncovered. The stencil may either be adhered to the glass article or held in the path of the sand or grit.

There are several disadvantages to this method. Particulate blasting usually results in a less durable and less aesthetically pleasing effect than can be obtained with acid frosting. Also the registration of the stencil from piece to piece cannot be maintained thus resulting in undesirable irregularities.

Because the stencil required for particle blasting must be of a thickness sufficient to withstand the sand or grit, fine lettering and decorative detail cannot be obtained. The life of the stencils is very limited and they must be replaced periodically. This process is slow and costly, requiring much manual labor and a high skill level for positioning and removal of stencils. Thus it is unsuitable for high volume processes.

Screen printing or brushing of acid containing paste is another method of achieving decorative frosting effects on glass. The method uses an acid paste consisting of hydrofluoric acid which can be screened or 20 brushed on the glass article. The paste is rinsed off with water and, in an appropriate time, produces a decorative, frosted effect. This method currently requires very large mesh screens which cannot reproduce fine details. The area of its application is limited. It cannot be used to achieve 360° frosting of cylindrical articles. Once acid paste touches the glass surface, frosting begins and cannot be reversed. Thus, articles improperly decorated cannot be reclaimed.

A decorative frosting effect can also be achieved by ceramic, frost imitating inks. This method uses a ceramic ink which is applied by screen printing or other decorating techniques to the glass surface. A drying and heat treatment fuses the decoration to the substrate. The resulting decoration closely simulates the appearance of a frosted surface. In this method, the decoration is raised above the substrate by the thickness of the ink deposit. The surface effect thus produced is not a true frost, and the texture of the surface is visibly different from a frosted glass surface.

In view of these problems, there is an apparent need for an improved method and materials for selectively etching the surface of glass articles. This method should be improved, as compared to prior mask methods with respect to the ease of depositing a mask, the time required to dry or cure a mask, the time required to prepare the surface for the mask and/or etchant, and the ease of removing the mask. Further, this method should avoid the constraints imposed by resist silk screening techniques, such as precise temperature control and the problems of physical control of the screen itself.

Concomitantly, it is desirable to eliminate the alternate expense, lack of detail, and irregularities of stencils. This would also eliminate the problem of replacing stencils as they wear out.

The general objective of the present invention is to provide a method and composition to facilitate the selective etching of a glass surface, which in general meets the foregoing needs and avoids or minimizes the foregoing problems.

BRIEF DESCRIPTION OF THE INVENTION

The foregoing objectives are met, in brief, by a method and a composition wherein the method includes applying a crosslinkable etchant resistant polymer mask to the area of the glass article which is to remain unetched, crosslinking the polymer mask, etching the remaining (unmasked) surface area of the article and removing the mask. Preferably the crosslinkable polymer composition comprises an ultraviolet curable combination of acrylate oligomers, crosslinkable co-monomers and photosensitizing agents, which is rendered etchant-resistant upon cross-linking by exposure to ultraviolet radiation.

The mask may be applied at room temperature by any of the currently used techniques, such as screening, brushing, and spraying. Further, in accordance with the present invention, the mask may be applied by a pad transfer technique.

The ability to apply the mask using a pad transfer technique facilitates etching of articles with irregular or complete shapes such as reverse curves. This is possible because the pad is made of a deformable, durable material such as silicone. The mask material is placed in wells which match the design to be implemented. When the pad is pressed onto these wells, the mask material goes onto the pad in the decorative form. The pad may then be pressed onto glass articles of shapes which were previously difficult to mask.

The composition of this invention is applied to the glass surface, in the desired pattern, in essentially liquid form, i.e. noncrosslinked and uncured. After deposition, the mask material, in accordance with the present invention, is crosslinked to render it essentially solid and etchant resistant. In the preferred embodiment of this invention, the transition of the mask material from the liquid to the solid state is very rapid because curing is accomplished by exposure to ultraviolet radiation possibly assisted by the heat of the ultraviolet lamp. The article is then dipped into the acid bath or exposed to particle blasting to achieve the desired selective frosting. This mask material is then removed with hot, pressurized water or steam leaving unfrosted glass decoration in contrast to the otherwise frosted surface.

For a better understanding of the present invention, reference may be made to the detailed description thereof, which follows.

DETAILED DESCRIPTION OF THE INVENTION

The inventive composition, in its raw form, must be capable of being deposited in and maintaining a well-defined pattern, of being rapidly crosslinked and of adhering to a glass substrate both before and after crosslinking. It must be capable of deposition upon the glass substrate by techniques which enable its use for very fine lines and extreme detail. Following rapid curing it must be resistant to the commonly used etchants; acid and particle blasting. After the etching operation, which creates the frosted appearance on areas of the glass article unprotected by the mask material, it must be capable of being easily removed. With the composition of the present invention, exposure of the mask to hot, pressurized water or steam accomplishes this mask removal without solvents, detergents, or pyrolosis.

The composition meeting these requirements preferably comprises a combination of the following: (1) acrylate oligomers such as epoxy acrylate, urethane acrylate, polyester acrylate, or acrylic acrylate oligomers; (2) co-monomers capable of crosslinking with the acrylate oligomer employed including, but not limited to, mono- or multi- functional acrylate monomers and other monomers such as vinyl pyrrolidone; (3) a crosslinking agent; (4) surfactants, such as silicones, fluorocarbons, etc., which will reduce bubbles, improve flow and aid in wetting of the substrate accepting the decoration. The composition may also include polymers such as polyvinyl acetals, polyvinyl acetate, acrylics, cellulose materials, etc., which are soluble in the oligomer, monomer materials. These polymers may be added as a means to improve adhesion to the glass substrate or to improve the quality of the mask pattern as applied by various techniques onto the substrate. Solvents may also be added to reduce viscosity, improve wetting of the substrate, and/or increase solubility of otherwise insoluble ingredients.

The appropriate composition is chosen depending on what type of etchant, acid, sand or grit, is to be used. The appropriate acrylate co-monomer is chosen depending on the acrylate oligomer with which crosslinking is desired. Preferably, a photosensitizing agent such as benzophenone or chlorothiozanthone is included to facilitate crosslinking of the mask upon exposure to ultraviolet irradiation. Solvents may also be included, as necessary, to produce the desired modified coating viscosity depending on the technique used to apply the mask material to the surface. However, the inclusion of a solvent will affect curing time.

Following are four examples in which glass surfaces have been etched in accordance with the present invention:

EXAMPLE 1

Various test samples have been prepared with compositions and parameters as described below.

Acid Resist Mask for Application to Glass Surfaces by Silk Screen Methods

| A. The crosslinkable mask composition used consisted of: | Parts |
|---|---|
| Shell Epocryl 370 (Epoxy Acrylate) | 57.5 |
| Sartomer SR230 (Diethylene Glycol Diacrylate available from Sartomer Co., a subsidiary of Atlantic Richfield) | 13.9 |

-continued

| A. The crosslinkable mask composition used consisted of: | Parts |
|---|---|
| Benzophenone | 5.2 |
| Chlorothiozanthone | 1.7 |
| Dow Corning 200 (Silicone) | 0.5 |
| 3M Co. FC430 (Fluorocarbon) | 0.2 |
| Pigment (ML#9 Red) (This is used so that the screened decoration can be easily seen prior to frosting the glass surface.) | 20.9 |

B. Application

The above composition was silk screened onto a glass article using 305 mesh polyester screens.

C. Curing

The glass article with mask pattern thereon was then exposed for less than 1 second to ultraviolet radiation from a Fusion Systems, Inc. 300 W/in. lamp equipped with a D-Bulb.

D. Frosting

The article was then immersed in an acid frosting bath for 20 seconds at room temperature. The acid frosting bath (the etchant) consisted of 100 grams water, 88 grams 70% hydrofluoric acid, and 250 grams ammonium bifluoride powder.

E. Removal of Mask Material.

Hot (170° F.) water was then washed over the article for 30 seconds to remove the mask therefrom.

EXAMPLE 2

Acid Resist Mask for Application to Glass Surfaces by Pad Transfer Decorating Technique

| | Parts |
|---|---|
| A. The crosslinkable mask composition used consisted of: | |
| Epocryl 370 (Shell) | 50.4 |
| DEGDA (Sartomer SR230) | 12.2 |
| Benzophenone | 3.1 |
| Chlorothiozanthone | 0.8 |
| Pigment (M.L. #R9 Red) (This is used so that the decoration can be easily seen prior to glass frosting.) | 18.3 |
| Polyvinyl Butyral/Surfactant Solution (This solution is necessary to improve decoration quality when applied by pad transfer methods.) The Polyvinyl Butyral/Surfactant solution consisted of: | 15.3 |
| Methyl Ethyl Ketone | 28 |
| Toluene | 12 |
| Butyl Cellosolve | 52 |
| Dow 200 Silicone | 2 |
| 3M Co. FC430 | 1 |
| Polyvinyl Butyral (Monsanto B98) | 5 |

The entire composition was mixed with the aid of three roll mill in order to achieve proper consistency and pigment dispersion.

B. Application

The above composition was applied to a glass article by the common silicone pad printing technique.

C. Curing

The glass article with the mask pattern thereon was then exposed for 5 seconds to ultraviolet radiation from a Fusion Systems, Inc. 300 W/in. lamp equipped with a D-Bulb.

D. Frosting and mask removal as outlined in Example #1.

EXAMPLE 3

Acid Resist Mask Material for Application by Brushing, Spraying, or Dipping Methods A. The crosslinkable mask composition used was as outlined in Example #1. This composition must be reduced in order to obtain the desired viscosity and drying time. Accordingly Methyl Ethyl Ketone was used as the reducing agent because it provides excellent reduction of the ultraviolet curable mask composition while producing materials having very rapid drying characteristics.

B. Application

This composition with the necessary viscosity achieved by use of the above solvents, was applied by selective dipping, i.e. the decoration was applied to glass stemware. The bowl of glass was dipped in acid resist material, leaving stem or pedestal to receive frosting.

C. Following application, the mask material was cured, the article was frosted, and the mask was removed as outlined in previous examples.

EXAMPLE 4

U.V. Curable Frosting Mask for Use with Particulate Blasting Selective Frosting Techniques

| The crosslinking mask composition used consisted of: | Parts |
|---|---|
| Polymer Systems Purelast 190 (Urethane Acrylate) | 57.5 |
| Sartomer SR230 (Diethylene Glycol Diacrylate) | 13.9 |
| Benzophenone | 5.2 |
| CTX (Chlorothiozanthone) | 1.7 |
| Dow Corning 200 Silicone | 0.5 |
| 3M Company FC430 (Fluorocarbon) | 0.2 |
| Pigment (M.L. #R9 Red) (This is used so that the decoration can be easily seen prior to frosting.) | 20.9 |

B. Application

The above composition was applied to glass article by the common silicone pad printing technique.

C. Curing

Exposure to 300 W/in. U.V. lamp system for 20 seconds.

D. Frosting

The article was frosted using particle blasting. The particle size used was approximately 400 mesh and it was applied to the glass surface at 40 psi.

E. Removal of Mask Material

As described in Example #1.

Several of the parameters may be varied as necessary. For instance, the time of the acid bath may vary depending on the acid bath activity and the frost appearance desired. Removal of the mask may be accomplished at lower temperatures for longer times or at higher temperatures for shorter times. Additionally, steam may also be employed to effect mask removal.

When using the pad transfer technique, the polyvinyl butyral solvent composition may vary in order to optimize quality and drying time. A ketone other than methyl ethyl ketone may be employed as a solvent when the mask is applied by brushing, spraying or dipping technique. Additionally, either butyl alcohol, methyl alcohol or Cellosolve solvents (Trademark—Union Carbide Corporation) may be employed as a solvent when using these other techniques.

The screen employed to apply the mask material for acid etching may be between 245 and 380 mesh. The application of the mask for particulate blasting may be performed using any of the common decorating techniques such as screening, pad transfer, dipping, spraying, etc. and the intensity of the ultraviolet radiation used cure the mask may be selected to effect curing at a speed compatible with production.

While this invention has been described with reference to specific embodiments thereof, it is not limited thereto. Instead, the claims which follow are intended to be construed to encompass not only the forms embodiments of the invention shown and described, but also such other forms and embodiments and such variants and modifications thereof as may be devised by those skilled in the art without departing from the true spirit and scope of the present invention as may be ascertained from the foregoing description.

For example, while this invention has been described with reference to the selective etching of glass, it may also be utilized in the selective etching of other ceramics, particularly including glazed ceramics.

Similarly, while all of the examples utilize the preferred embodiment of the crosslinkable polymer mask composition of this invention, other types of crosslinkable resins, such as a chemically or heat crosslinkable polymer may also be used. Even thermoset resins and thermoplastic resins (which may not be crosslinked in the conventional sense) may be used if they can be deposited and adhered to the glass in a well-defined pattern, will resist a selected etchant can be readily removed thereafter.

We claim:

1. Method of selectively etching an image on a glass surface for producing decorative frosting effects, comprising depositing on the surface in the negative of said image a pattern of a crosslinkable resin mask capable, upon crosslinking, of resisting a subsequently applied etchant and also capable, upon crosslinking, of being removed from said glass surface by stripping or hot water or steam treatment, crosslinking said resin, etching said surface with said etchant and removing said crosslinked resin.

2. Method, as recited in claim 1, wherein said resin mask comprises an acrylate oligomer, a co-monomer capable of crosslinking with said acrylate oligomer, and a crosslinking agent therefor.

3. Method, as recited in claim 1, wherein said etching step comprises the application of acid etchant to said glass surface.

4. Method, as recited in claim 1, wherein said etching step comprises impelling hard particles against said glass surface.

5. Method, as recited in claim 1, wherein said resin mask is deposited by pad transfer technique.

6. Method, as recited in claim 2, wherein said crosslinking agent is a photosensitizing agent and said resin mask is crosslinked by exposure to ultraviolet radiation.

7. Method, as recited in claim 3, wherein said resin mask includes epoxy acrylate oligomer.

8. Method, as recited in claim 4, wherein said resin mask includes urethane acrylate oligomer.

9. Method, as recited in claim 5, wherein said resin mask contains a solvent.

10. A polymer composition comprising an acrylate oligomer, a co-monomer capable of crosslinking with said acrylate oligomer, and a crosslinking agent for said oligomer and said co-monomer, said composition being capable of being applied to and adhering to a glass surface, in a pre-selected pattern, being crosslinked thereon, resisting of a glass etchant applied thereto and of being stripped from said glass surface.

11. A composition, as recited in claim 10, wherein said acrylate oligomer is selected from the group consisting of urethane acrylate, polyester acrylate, and acrylic acrylate oligomer.

12. A composition, as recited in claim 10, wherein said crosslinking agent is a photosensitizing agent capable of rendering an etchant-resistant mask curable by means of exposure to ultraviolet radiation.

13. A composition, as recited in claim 12 wherein said photosensitizing agent is benzophenone or chlorothiozanthone.

14. A composition as recited in claim 10 comprising the oligomer epoxy acrylate, the co-monomer diethylene glycol diacrylate and the crosslinking agents benzophenone and chlorothiozanthone.

15. A composition, as recited in claim 10, comprising the oligomer urethane acrylate, the comonomer diethylene glycol diacrylate and the crosslinking agents benzophenone and chlorothiozanthone.

16. A composition, as recited in claim 10, including surfactants.

17. A composition, as recited in claim 10, including solvents.

18. A composition, as recited in claim 16, wherein said surfactants are chosen from the group consisting of silicones and fluorocarbons.

19. A composition, as recited in claim 17, wherein said solvents are chosen from the group consisting of ketones, alcohols and Cellosolve solvents.

20. A composition, as recited in claim 19, wherein said ketone is methyl ethyl ketone.

21. A composition, as recited in claim 19, wherein said alcohol is chosen from the group consisting of butyl alcohol and methyl alcohol.

* * * * *